June 8, 1965 A. L. CLAES ETAL 3,187,417
APPARATUS FOR FABRICATING EXTENDED SURFACE PLATES
Filed March 11, 1963 2 Sheets-Sheet 1
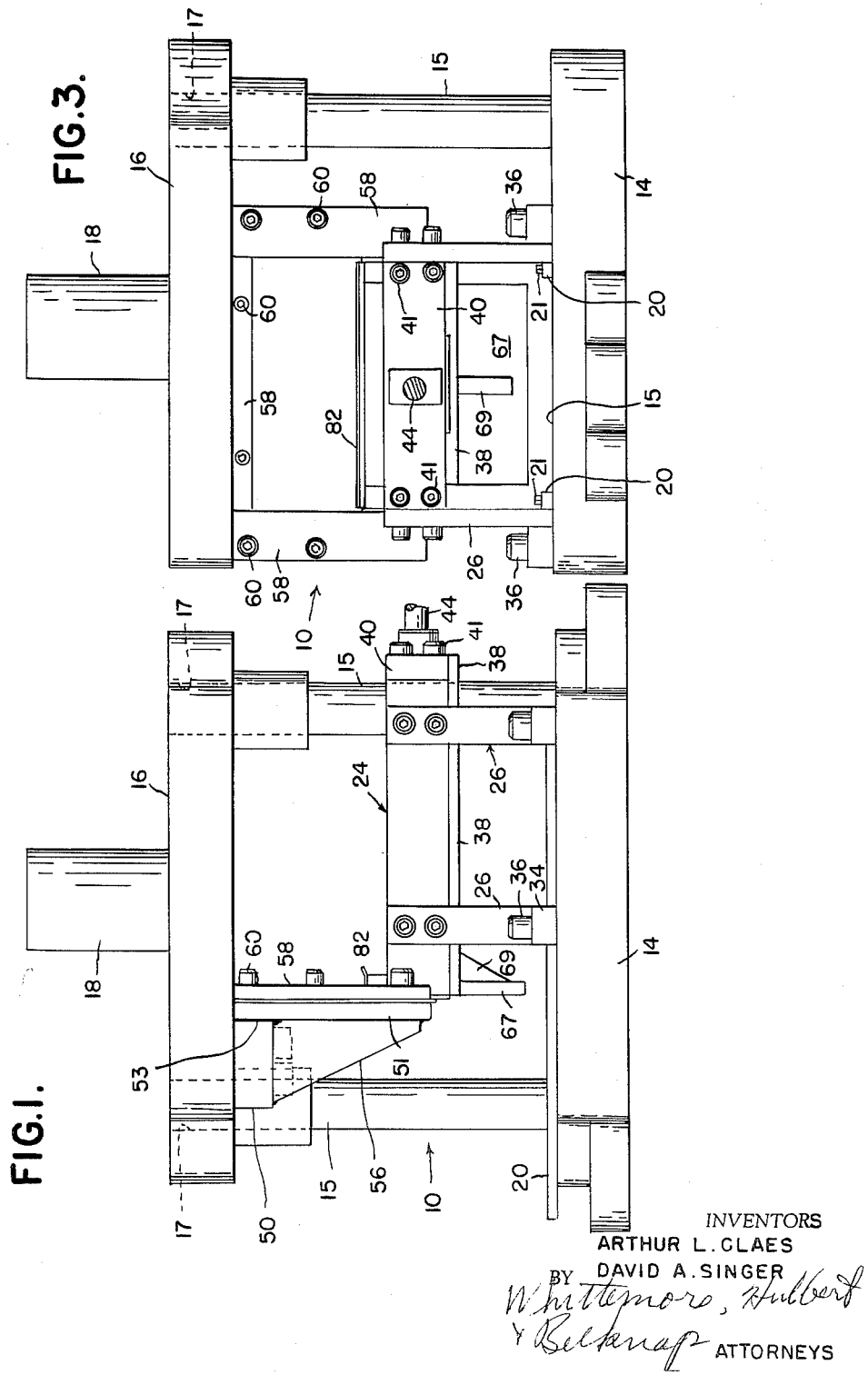
INVENTORS
ARTHUR L. CLAES
DAVID A. SINGER
BY
Whittemore, Hulbert
& Belknap ATTORNEYS

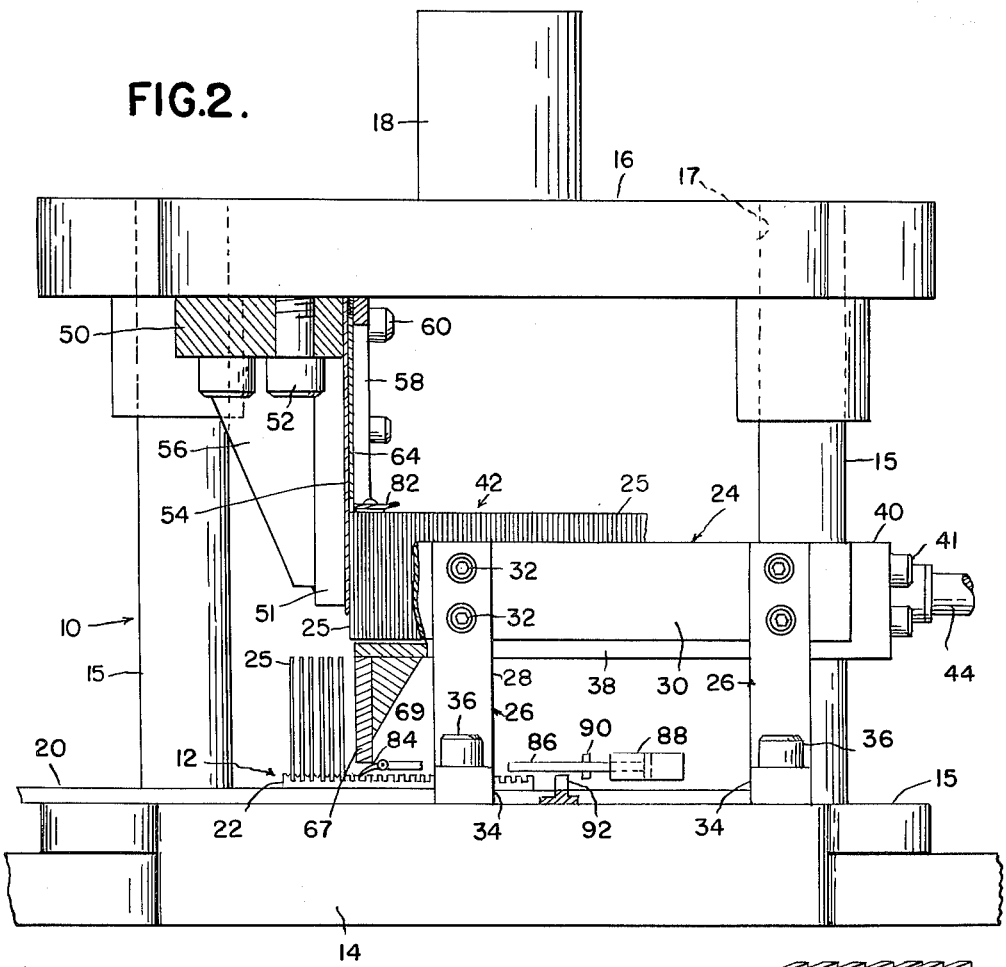

United States Patent Office

3,187,417
Patented June 8, 1965

3,187,417
APPARATUS FOR FABRICATING EXTENDED
SURFACE PLATES
Arthur L. Claes, East Detroit, and David A. Singer,
Harper Woods, Mich., assignors to Calumet & Hecla,
Inc., Allen Park, Mich., a corporation of Michigan
Filed Mar. 11, 1963, Ser. No. 264,298
20 Claims. (Cl. 29—202)

This invention relates to heat exchangers and more particularly to an apparatus for fabricating an extended surface plate.

The article of manufacture of the present invention consists of a base plate having at one side thereof a plurality of spaced transversely extending alternate ribs and grooves, with fins having edge portions fitting snugly within the grooves of the base plate. In the prior art method of assembling an extended surface plate, a large portion of the operation is performed manually. In other words, each fin is manually inserted in the groove or notch and fixedly secured therein between adjacent ribs of the base plate. This results in an extended surface plate that is slow to produce, non-uniform in construction, and expensive to manufacture.

The present invention has overcome the disadvantages of the prior art by providing an apparatus for fabricating an extended surface plate or heat exchanger with a minimum amount of time and labor and of uniform construction.

In the present invention the apparatus or device is mounted in a small vertical punch press or the like. The apparatus includes a supply hopper which holds a supply of precut fin material. The apparatus includes means for selecting one fin per press cycle and which will insert and stake the fin in position, in the base plate. Means are also provided for advancing the base plate a distance of one groove or fin space per cycle so that when the apparatus is in an open position ready to begin the cycle a groove of the base plate is in a position to receive a fin from the hopper. The press furnishes the necessary cycling action and a sufficient amount of pressure to stake the fin in place in the base plate.

An object of the present invention is to provide an apparatus for fabricating an extended surface plate of the aforementioned type comprising a support having a work station, a fin transfer station for one or more fins, means on the support for guiding the base plate for longitudinal movement through the work station to successively position the grooves of the base plate in the work station, and a fin actuator for the transfer station for moving a fin in a direction transverse to the direction of movement of the base plate to seat an edge portion thereof in the groove of the base plate in the work station.

A further object of the present invention is to provide an apparatus of the aforementioned type wherein means are provided for staking the fin in the groove of the base plate in the work station by displacing material from a rib adjacent thereto to fixedly secure the fin to the base plate.

A still further object of the present invention is to provide an apparatus of the aforementioned type wherein means are provided at the transfer station for guiding the fin during the transverse movement thereof by the fin actuator.

Another object of the present invention is to provide an apparatus of the aforementioned type wherein resilient means are provided for biasing the fins in the direction of movement of the base plate.

Still another object of the present invention is to provide an apparatus of the aforementioned type wherein means are provided for advancing the base plate in groove-by-groove increments through the work station.

A further object of the present invention is to provide an apparatus of the aforementioned type which is operated automatically for inserting and staking the fins in the base plate.

A still further object of the present invention is to provide an apparatus of the aforementioned type wherein the fin actuator includes a resiliently biased shuttle plate having the bottom edge thereof engageable with the top edge of the fin opposite the groove of the base plate in the work station.

A further object of the present invention is to provide an automatically operated apparatus, including a movable die shoe, wherein means responsive to the upstroke of the die shoe are provided for advancing the base plate in groove-by-groove increments through the work station.

It is thus another object of this invention to provide an apparatus of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

FIGURE 1 is a side elevation of the fixture or apparatus prior to loading the hopper with precut fins.

FIGURE 2 is a right hand end view of the apparatus illustrated in FIGURE 1.

FIGURE 3 is a side elevation of the apparatus when loaded with fins, with parts broken away and in section, and illustrating the apparatus in an open position prior to moving a fin into the base plate upon operation of the punch press or the like.

FIGURES 4–7 are fragmentary sectional views showing the various positions of the shuttle plate and staking rail of the apparatus and illustrating the manner in which a fin is moved into the opposite groove in the base plate and thereafter staked therein.

FIGURE 8 is a fragmentary perspective view of an extended surface plate.

The mechanical device or apparatus illustrated in the drawings is designated by the numeral 10 and is adapted to be mounted in a relatively small vertical punch press which furnishes the necessary cycling action and a sufficient amount of pressure to perform the staking operation. The apparatus 10 is designed to fabricate an extended surface plate or heat exchanger 12, as best illustrated in FIGURE 8, which is of uniform construction and wherein the production qualities thereof are controlled by the number of punch press strokes per minute and the operator's ability to keep the apparatus 10 supplied with precut fins.

The mechanical device or apparatus 10 comprises a lower stationary element or support 14 which is appropriately secured to or mounted on the base of the punch press. A pair of upstanding spaced elongated guide elements 15 is located near one side edge of the support 14 and appropriately secured thereto. An upper movable element, member, or die shoe 16, which forms part of the punch press, is spaced above the stationary support 14 and is provided with a pair of openings 17 near one side edge thereof which receives the guide elements 15. The punch press is supplied with suitable controls, not shown. With such an arrangement the die shoe 16, upon operation of the punch press, is guidingly moved on the guide elements 15 towards and away from the support 14. The movement of the die shoe 16 is accomplished by means of the shank 18 which is carried by parts of the punch press, not shown. As an example, the shank 18 may be connected to or form a part of a hydraulic cylinder or motor which is effective to move the die shoe 16 in cycles, each cycle of the die shoe 16 consisting of a downstroke and an upstroke.

The support 14 is provided on the upper surface 15 thereof with a pair of laterally spaced longitudinally extending guide bars 20, the oppositely facing inner surfaces of which guide the base plate 22 of the extended surface plate 12 in its longitudinal movement as will be subsequently described. The guide bars 20 may be secured to the stationary member 14 by a plurality of bolts 21 as best illustrated in FIGURE 3. A supply hopper 24 for supplying a plurality of relatively thin precut fins 25 to the apparatus 10 is mounted between the support 14 and the die shoe 16. The hopper 24 is spaced above the support 14 by a hopper support which includes a pair of support elements 26 on each side of the hopper 24. Each support element 26 includes a relatively long arm 28 which is fastened to the side walls 30 of the hopper 24 by nuts and bolts 32 and a relatively short arm 34 which is connected to the stationary support 14 by a bolt 36. The hopper 24 includes, besides the side walls 30, a bottom wall 38 and an end wall 40 which is secured to the side walls 30 by bolts 41. The top and left end of the hopper 24 are open for receiving and then discharging the fins 25. A plurality of precut fins 25 is positioned in the hopper 24 and is biased towards the open left end thereof by means of a spring loaded fin pusher 44 which applies a biasing force to the fins 25 so as to continuously urge the fins 25 towards the discharge or open end of the hopper 24. The fin pusher 44 is carried by the end wall 40 of the hopper 24 and is adjustable to accommodate any number of fins.

The upper member or die shoe 16 is provided with a transversely extending plate 50 which is secured to the underside thereof by bolts 52. A transversely extending vertically arranged guide plate 51 is located at the rear edge of plate 50 and is secured thereto by welds 53. The downwardly extending guide plate 51 is reinforced by a pair of spaced rail brackets 56. The rail brackets 56 are spaced apart at opposite edges of the plate 51 and secured thereto and to plate 50 by welding. A relatively thin, vertically extending, staking rail 54 is carried by the movable member or die shoe 16 and is held against the other side of guide plate 51 by means of a pair of framing members 58. The framing members 58 are on one side of and spaced slightly from the staking rail 54 and are appropriately secured to the plates 50 and 51 and rail brackets 56 by means of bolts 60. Interposed in the space between the framing members 58 and the staking rail 54 is a vertically mounted movable shuttle plate 64 which is biased in a downward direction by means of a spring 65. The spring 65 is interposed between the lower surface 61 of the die shoe 16 and the upper edge 63 of the shuttle plate 64. The staking rail 54 is directly connected to the die shoe 16 by welding or by other fastening means and is provided at the lower end thereof with a pointed tip 66 which is used for a purpose to be hereinafter described.

The base plate 22 has a plurality of transversely extending alternate ribs 70 and grooves 72. During operation, one groove 72 of the base plate 22 is located in the work station of the apparatus ready to receive a fin 25 from the fin transfer station of the apparatus during the downstroke of the die shoe 16.

A transversely extending guide plate 67, reinforced by a pair of spaced guide brackets 69, is secured to the bottom surface of the bottom wall 38 by welding or by other fastening means. The guide plate 67 forms a support surface for the fin 25 during movement thereof from the fin transfer station to the work station.

When the die shoe 16 is in the fully open position, as illustrated in FIGURES 1–3, the staking rail 54, shuttle plate 64, and spring 65 are in the position illustrated in FIGURE 4. The spring 65 and shuttle plate 64 form a yieldable follower or fin actuator which is located adjacent the fin transfer station of the apparatus 10 for transferring the leading fin 25 in the discharge opening of the hopper 24 to the opposite groove 72 of the base plate 22 in the work station of the apparatus 10.

During the downstroke of the die shoe 16 the yieldable follower or fin actuator is correspondingly moved through the fin transfer station so that the lower or bottom edge 74 thereof engages the top edge 76 of the fin 25 in the discharge opening of the hopper 24 as best illustrated in FIGURE 5. Upon continued downward movement of the die shoe 16, the leading fin 25 is moved vertically downwardly until the bottom edge portion 78 thereof is seated in the opposite groove 72 of the base plate 22 in the work station as illustrated in FIGURE 6. Thereafter, continued downward movement of the die shoe 16 will not produce any movement of the leading fin 25 or shuttle plate 64, but will compress spring 65 and urge the pointed tip 66 of the staking rail 54 into the rib 70 immediately in front of the groove 72 of the metal base plate 22 in the work station of the apparatus 10 so as to displace metal in said rib and fixedly secure or stake the fin in the base plate 22. The spring 65, when compressed, holds the fin 25 in the groove 72 and allows the staking rail 54 to stake the fin in the base plate 22. As a result thereof, V-shaped notches 80 are formed in each of the ribs 70 of the base plate 22 as best illustrated in FIGURE 8.

After the leading fin 25 has been seated and then staked in the opposite groove 72 in the base plate 22 in the work station, the die shoe 16 is moved in its upstroke so as to remove the staking rail 54 from the base plate 22 and returned to the open position illustrated in FIGURES 1–4. At such time, the spring 65 returns the shuttle plate 64 to its normal position with respect to the rail 54 ready for the next cycle of operation. After the lower edge portion 74 of the shuttle plate 64 has moved past the supply hopper 24, the fin pusher 44 urges the next leading fin 25 into the discharge opening of the hopper 24, with the upper edge 76 thereof opposite the lower edge 74 of the shuttle plate 64. The forward movement of fin 25 is limited by its engagement with the staking rail 54. A transversely extending guide element 82 is mounted above the fins 25 at the forward or discharge end of the hopper 24 to prevent the fins 25 from being moved upwardly from the hopper 24 during the upstroke of the die shoe 16.

Means responsive to the operation of the punch press are provided for advancing the base plate 22 in groove-by-groove increments during each cycle of operation. As an example, a pawl 84 is provided which is adapted to move into the second trailing groove 72 of the base plate 22 behind the staked groove in the work station and, upon operation of the punch press or other cycling device, move the base plate 22 forwardly one groove to position the first trailing groove 72 in the work station. The pawl 84 is connected to an elongated arm 86 which is connected to and operated by a fluid motor 88 as illustrated in FIGURE 2. The arm 86 is provided with an abutment 90 which is adapted to engage the stop 92 carried by the base 14. During the upstroke movement of the die shoe 16, the fluid motor 88, which is connected to suitable control valves, not shown, is energized so as to move the pawl 84 into said second trailing groove 72 of the base plate 22 and thereafter move the pawl 84 and arm 86 forwardly one groove until the first trailing groove is in the work station. The amount of movement is limited by the engagement of the abutment 90 with the stop 92. Thereafter, the motor 88 is energized in the opposite direction so as to remove the pawl 84 from the base plate 22 and return it to a position ready for operation during the next cycle of the die shoe 16.

The fins 25 are precut and loaded manually in the hopper 24. The fin pusher 44 biases the leading fin to a position beneath the shuttle plate 64 in the fin transfer station and above the groove of the base plate in the work station. At this time the apparatus 10 is in an open position. Upon actuation of the press, the die shoe 16 is moved in its downstroke so that the shuttle plate 64 contacts the leading fin 25 and urges the fin downwardly into the groove 72 at the work station so as to seat the lower edge portion thereof in said groove. The spring 65 is compressed upon further downward movement of the die shoe 16 so as to hold the fin 25 in the groove and permit the advancement of the staking rail 54 into the rib 70 immediately forward of the groove so as to displace metal and stake the fin in position in the base plate 22. After the fin has been staked, the die shoe 16 and associated parts are returned to the open position ready for the next cycle. It should be noted that during the transverse movement of the fin it is guided on the sides thereof by the staking rail 54 and the guide plate 67.

The drawings and the foregoing specification constitute a description of the improved apparatus for fabricating extended surface plates in such full, clear, concise, and exact terms as to enable any person skilled in the art to practice the invention, the scope of which is indicated by the appended claims.

What we claim as our invention is:

1. An apparatus for fabricating an extended surface plate having a base plate with spaced transversely extending alternate ribs and grooves therein, with fins having edge portions fitting snugly within the grooves of the base plate, said apparatus comprising: a support having a work station; a fin transfer station for one or more fins; means on said support for guiding the base plate for longitudinal movement through said work station to successively position the grooves of the base plate in the work station; a fin actuator for said transfer station engageable with one edge portion of a fin for moving the fin in a direction transverse to the direction of movement of the base plate to seat another edge portion thereof in the groove of the base plate in the work station, and means for establishing locking pressure between the edge portion of each fin inserted in a groove and the adjacent side surfaces of the groove to retain the fins in position and to insure good heat conducting relationship thereto.

2. An apparatus defined in claim 1 wherein means are provided at said transfer station for guiding the fin during the transverse movement thereof by said fin actuator.

3. An apparatus defined in claim 1 wherein resilient means are provided for biasing the fins in the direction of movement of the base plate.

4. An apparatus defined in claim 1 wherein means are provided for advancing the base plate in groove-by-groove increments through said work station.

5. An apparatus for fabricating an extended surface plate having a base plate with spaced transversely extending alternate ribs and grooves therein, with fins having edge portions fitting snugly within the grooves of the base plate, said apparatus comprising: a support having a work station; a fin transfer station for one or more fins; means on said support for guiding the base plate for longitudinal movement through said work station to successively position the grooves of the base plate in the work station; a fin actuator for said transfer station engageable with one edge portion of a fin for moving the fin in a direction transverse to the direction of movement of the base plate to seat another edge portion thereof in the groove of the base plate in the work station, and means for staking the fin in the groove of the base plate in the work station by displacing material from a rib adjacent thereto to fixedly secure the fin to the base plate.

6. An apparatus for fabricating an extended surface plate having a metal base plate with spaced transversely extending alternate ribs and grooves therein, with fins having edge portions fitting snugly within the grooves of the base plate, said apparatus comprising: a support having a work station; a fin transfer station for one or more fins; means on said support for guiding the base plate for longitudinal movement through said work station to successively position the grooves of the base plate in the work station; a fin actuator for said transfer station engageable with one edge portion of a fin for moving the fin in a direction transverse to the direction of movement of the base plate to seat another edge portion thereof in the groove of the base plate in the work station; and means for staking the fin in the groove of the base plate in the work station by displacing metal from the rib adjacent and immediately in front of the groove in the work station to fixedly secure the fin to the base plate.

7. An apparatus defined in claim 6 wherein means are provided at said transfer station for guiding the fin during the transverse movement thereof by said fin actuator.

8. An apparatus defined in claim 6 wherein resilient means are provided for biasing the fins in the direction of movement of the base plate.

9. An apparatus defined in claim 6 wherein means are provided for advancing the base plate in groove-by-groove increments through said work station.

10. An automatically operated apparatus for fabricating an extended surface plate having a base plate with spaced transversely extending alternate ribs and grooves therein, with fins having edge portions fitting snugly within the grooves of the base plate, said apparatus comprising: a support having a work station; a fin transfer station for one or more fins; a die shoe spaced above said support and movable in cycles with respect to said support, each cycle consisting of a downstroke and an upstroke; means on said support for guiding the base plate for longitudinal movement through said work station to successively position the grooves of the base plate in the work station; a fin actuator for said transfer station operatively connected to said die shoe and engageable with one edge portion of a fin during the downstroke thereof to move a fin in a direction transverse to the direction of movement of the base plate to seat another edge portion thereof in the groove of the base plate in the work station; a staking rail operatively connected to said die shoe and movable therewith during the downstroke thereof for displacing material in the rib immediately in front of the groove of the base plate in the work station to stake the last mentioned edge portion of the fin in the groove; and means responsive to the upstroke of the die shoe for advancing the base plate in groove-by-groove increments through said work station to receive fins from said transfer station.

11. An automatically operated apparatus defined in claim 10 wherein means are provided at said transfer station for guiding the fin during the transverse movement thereof by said fin actuator.

12. An automatically operated apparatus defined in claim 10 wherein said fin actuator includes a resiliently biased shuttle plate having the bottom edge thereof engageable with the top edge of the fin opposite the groove of the base plate in the work station.

13. An automatically operated apparatus defined in claim 10 wherein means responsive to the upstroke of the die shoe are provided for advancing the base plate in groove-by-groove increments through said work station.

14. An automatically operated apparatus defined in claim 13 wherein said last mentioned means includes mechanical means for effecting movement of the base plate in groove-by-groove increments.

15. An apparatus for making a heat exchanger comprising a support, means on said support for guiding a base plate having spaced transversely extending alternate ribs and grooves therein for longitudinal movement, a fin actuator engageable with one edge portion of the fin for moving the fin in a direction transverse to the direction of movement of the base plate to seat another edge portion of the fin in a groove in the base plate, means for guiding the fin during transverse movement thereof, and means for staking the fin in the groove by displacing material from a rib adjacent said groove in the base plate.

16. An apparatus defined in claim 15 wherein said fin actuator includes a resiliently biased shuttle plate having the bottom edge thereof engageable with the top edge of the fin opposite the groove in the base plate.

17. An apparatus comprising a fixed plate, a die shoe spaced above said fixed plate and movable vertically with respect thereto, means on said fixed plate for guiding a base plate having spaced transversely extending alternate ribs and grooves therein for longitudinal movement, a supply hopper intermediate said fixed plate and die shoe having an exit opening through which fins dimensioned to have one edge portion fit snugly within a groove of the base plate are discharged one by one in timed sequence to the movement of the die shoe, means carried by said die shoe engageable with another edge portion of a fin for moving the fin in the discharge opening of the supply hopper in a direction transverse to the direction of movement of the base plate to seat the one edge portion thereof in the opposite groove in the base plate, a staking rail carried by and movable with said die shoe for displacing material in the rib immediately in front of the opposite groove in the base plate so as to stake the last mentioned edge portion of the fin in the groove, and means for advancing the base plate in groove-by-groove increments.

18. An apparatus for fabricating a heat exchanger comprising: a stationary element; a die shoe spaced above said stationary element and movable vertically with respect to said stationary element; means on said stationary element for guiding a base plate, having spaced transversely extending alternate ribs and grooves therein, for longitudinal movement; a supply hopper intermediate said stationary element and said die shoe having an exit opening through which fins dimensioned to have the lower edge portion fit snugly within a groove of the base plate are discharged one by one in timed sequence to the movement of said die shoe; means operatively connected to said die shoe for moving the fin in the discharge opening of the supply hopper in a direction transverse to the direction of movement of the base plate to seat the lower edge portion thereof in the opposite groove in the base plate; a staking rail operatively connected to said die shoe for displacing material in the rib of the base plate immediately in front of the opposite groove so as to stake the fin therein; and means for advancing the base plate in groove-by-groove increments.

19. An apparatus comprising a fixed element, a movable element spaced above said fixed element, guide means on said fixed element for mounting a base plate having spaced transversely extending alternate ribs and grooves therein for longitudinal movement, a supply hopper intermediate said fixed and movable elements having an exit opening through which fins are discharged successively in timed sequence to the movement of the base plate, means carried by said movable plate for moving the fin in the discharge opening of the supply hopper in a direction transverse to the direction of movement of the base plate to seat the lower edge portion thereof in the opposite groove of the base plate, means for thereafter staking the lower edge portion of the fin in the opposite groove of the base plate by displacing material from the rib forward of and adjacent the groove, and means for advancing the base plate in groove-by-groove increments.

20. An automatically operated apparatus comprising a fixed element, a movable element spaced above said fixed element and movable in cycles, each cycle consisting of a downstroke and an upstroke, guide means on said fixed element for mounting a base plate having spaced transversely extending grooves therein for longitudinal movement, a supply hopper intermediate said fixed and movable elements having an exit opening through which fins are discharged successively in timed sequence to the movement of the base plate, means carried by said movable plate for moving the fin in the discharge opening of the supply hopper in a direction transverse to the direction of movement of the base plate during the downstroke of the movable element to seat the lower edge portion thereof in the opposite groove in the base plate, means for thereafter staking the lower edge portion of the fin in the groove by displacing material at the forward end of the groove during further downstroke of the movable element, and means for advancing the base plate in groove-by-groove increments during the upstroke of the movable elements.

References Cited by the Examiner
UNITED STATES PATENTS

| | | | |
|---|---|---|---|
| 1,921,975 | 8/33 | Jones et al. | 29—33.6 |
| 1,996,566 | 4/35 | Boerger | 29—202 |
| 2,004,387 | 6/35 | Dewald | 29—157.3 |

WHITMORE A. WILTZ, *Primary Examiner.*

THOMAS H. EAGER, *Examiner.*